(12) United States Patent
Peers

(10) Patent No.: US 6,620,449 B1
(45) Date of Patent: Sep. 16, 2003

(54) PROCESS AND DEVICE FOR PREPARING EGGS IN VARIOUS FORMS

(76) Inventor: Philippe Peers, Galgestraat 1, 8490 Wervik (BE)

( * ) Notice: Subject to any disclaimer, the term of this patent is extended or adjusted under 35 U.S.C. 154(b) by 0 days.

(21) Appl. No.: 09/857,440

(22) PCT Filed: Dec. 2, 1999

(86) PCT No.: PCT/BE99/00157

§ 371 (c)(1),
(2), (4) Date: Jul. 23, 2001

(87) PCT Pub. No.: WO00/32078

PCT Pub. Date: Jun. 8, 2000

(30) Foreign Application Priority Data

Dec. 3, 1998 (BE) .............................. 9800874

(51) Int. Cl.[7] .............................. A23L 1/32; A47J 29/00
(52) U.S. Cl. .......................... 426/523; 99/353; 99/373; 99/427; 99/440; 99/443 C; 426/510; 426/515; 426/438
(58) Field of Search ................................ 426/515, 523, 426/510, 438; 99/353, 373, 427, 440, 443 C

(56) References Cited

U.S. PATENT DOCUMENTS 3,603,243 A * 9/1971 Foster .......................... 99/440
4,426,400 A    1/1984 Newlin et al.
4,686,895 A    8/1987 Ishino et al.
4,862,790 A * 9/1989 Platteschorre et al. ........ 99/353

FOREIGN PATENT DOCUMENTS

EP   0 317 349      5/1989
JP   60 224468 A  * 11/1985

OTHER PUBLICATIONS

Patent Abstracts of Japan, vol. 7, No. 46 (C–153), Feb. 23, 1983 & JP 57 198070 (Kiyo Koukiyoku) Dec. 4, 1982.

* cited by examiner

Primary Examiner—George C. Yeung
(74) Attorney, Agent, or Firm—Sughrue Mion, PLLC

(57) ABSTRACT

A process and device for producing eggs in various forms, such as among others boiled, poached or deep fried eggs, or their separate component parts, i.e. the yolk or egg white thereof or whole egg, called hereinafter the eggs. The eggs are moved in moulds through two chambers, a first one in which water vapour is maintained at a temperature which is sufficient to bring the eggs superficially in a state allowing to direct the moulds further through a second chamber in which the boiling process is completed by circulating the moulds in this chamber through boiling water, oil, steam or an appropriate liquid.

10 Claims, 3 Drawing Sheets

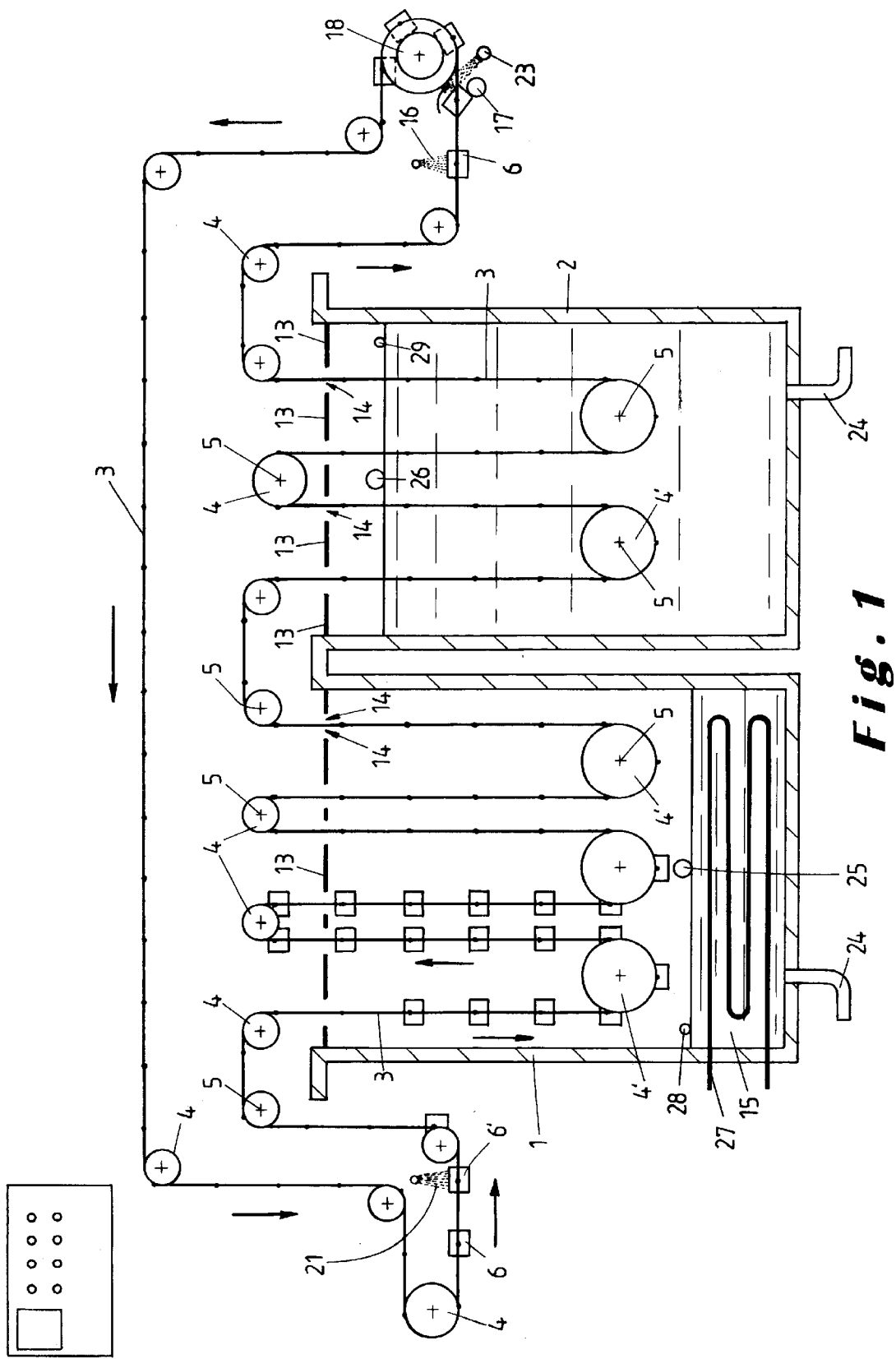

# PROCESS AND DEVICE FOR PREPARING EGGS IN VARIOUS FORMS

BACKGROUND OF THE INVENTION

This invention relates to a process for cooking eggs or parts thereof, having the steps of removing the egg from its shell, introducing the egg or part thereof into a mould and moving the mould through at least a first chamber, thereby subjecting the mould containing the egg to a heat treatment so as to cook the egg. The invention furthermore relates to a device for cooking eggs or parts thereof.

The production of large to very large quantities of prepared eggs in various forms on an industrial scale should be carried out by applying a process and matching devices showing a sufficient flexibility to treat the eggs every time in the required way. By "preparation of eggs" is meant the boiling, poaching or deep frying of eggs, and also, whenever it is feasible, the preparation of the component parts thereof.

It is thus a particular aim of the invention to prescribe a process and a device enabling to boil, if required deep fry or poach, heavy eggs (58–65 g) on an industrial scale without losses.

The European Patent Application no. EP-A-0,317,349 describes a device and a process for cooking egg components on an industrial scale, more particularly their separate component parts, i.e. the egg white and the yolk, in an egg-shaped form. The egg components are transported in moulds by means of a conveyor through a single heating chamber in the form of an oven. The extremely complicated device according to this patent application is in no way suitable for preparing eggs in various forms.

In Japanese patent publication JP 60224468, a device is described which is exclusively designed to boil eggs in their shell, the device comprising a main cooking chamber using steam or hot gas at a higher temperature, preceded by a hot water preheating chamber, but such preheating is only suitable for eggs when cooked in their shells. JP-A57/198070 and US-A-4686896 relate to a device for the preparation of boiled eggs involving but one single heating chamber.

None of the processes and/or devices described in the above quoted documents is able to produce eggs in various forms on an industrial scale. There is thus a need for a process and device with which the range of cooking conditions which can be achieved when using an automatic cooking device can be extended, so as to be able to prepare eggs with greater flexibility and in a wider variety of different forms.

SUMMARY OF THE INVENTION

It is an aim of this invention to provide a process and likewise a device for cooking eggs, each of the general type identified above, to be capable of cooking eggs in a wide variety of manners by using technically reliable and structurally simple means. A particularity of the invention is the high degree of flexibility it affords.

According to the invention, the device consists of two successive chambers through which two conveyor chains circulate in parallel planes, and moulds suspended between these conveyor chains, while means are provided to maintain vapour in the first chamber at a temperature to bring the eggs at the end of their course through the first chamber superficially in a state allowing the further circulation of the moulds with the eggs through the second chamber filled with a boiling liquid or vapours (steam).

According to a particular embodiment of the invention, the above said moulds consist of cavities provided in bars which are suspended by their extremities, by means of pins attached to above said chains.

In a possible embodiment, means are provided to treat said above moulds, downstream of the above said second chamber, first with water under pressure and then at least once with compressed air, and further means are provided to rotate above said bars about their geometrical axis, more particularly substantially before or at the location where pressurized water and the location where compressed air are injected.

Other details and advantages of the invention will show from the following description of a process and a device for producing eggs in various forms. This description is exclusively given as an example and does not limit the invention. The reference numbers refer to the attached figure.

BRIEF DESCRIPTION OF THE DRAWING

FIG. 1 is a schematic representation of the device according to the invention.

DETAILED DESCRIPTION OF THE INVENTION

Figure 3:
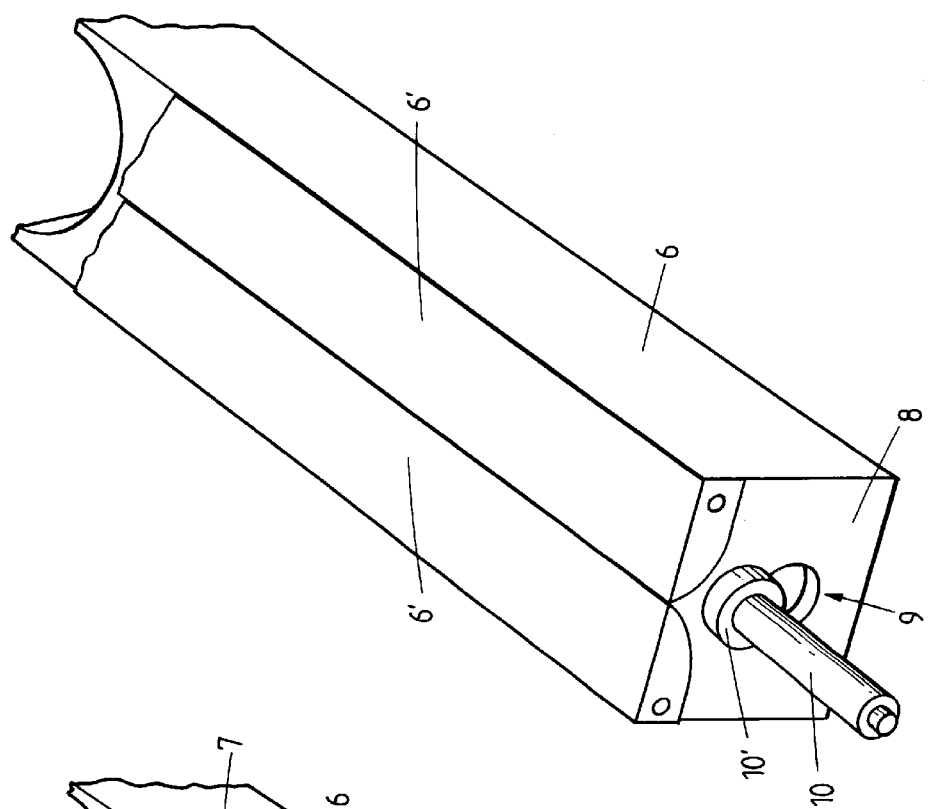
FIG. 3 relates to a variant of a bar with moulds.

The process according to the invention has been developed to produce prepared eggs in various ways on an industrial scale. By prepared eggs is to be understood eggs answering to one of the following definitions: hard boiled eggs, poached eggs, deep fried eggs and egg components prepared in any way, such as egg white or yolks thereof, of whole eggs. The process and the device derived therefrom consequently have been developed to treat these different egg products with the same technical means, i.e. without having to change the essential parts of the device, except the moulds which are particularly easy to exchange.

Furthermore, the process and device allow to process eggs of all categories (from small to large ones), whereas the present existing devices to cook eggs in their shell are limited to processing small eggs. Eggs of more than 58 to 60 g boil out during the boiling phase (the shell bursts open), and this results in large losses during production. With such systems, the loss, for example, amounts from 5 to 10% for small eggs to 20 to 30% and more for heavier eggs of more than 60g.

The process according to the invention provides for the treatment of the eggs (meaning eggs in the various states described above) in a device offering the largest possible flexibility. Consequently, the process and device offer the possibility to use eggs in the used moulds, for boiling eggs in their shell, as well as for producing poached eggs or separately boiled egg components, even with additives such as herbs, spices or other ingredients.

The device represented schematically in FIG. 1 essentially consists of two chambers 1 and 2 through which conveyor chains 3 are directed. The two conveyor chains run over a number of toothed wheels, which may be subdivided into toothed wheels 4 which are located completely outside the chambers 1 and 2, and a number of toothed wheels 4', which are located in the chambers 1 and 2. All toothed wheels are fitted in twos, either revolving loosely or not, onto a common axle 5. The set of two chains is actuated at a random location to be determined outside the chambers 1 and 2.

Between the parallel running chains, bars 6 are suspended and are maintained always in a horizontal position (as shown in FIG. 1) so that the eggs do not fall out. The bars are for example made of aluminium coated with a plastic material having a high chemical stability or inertness. A material suitable therefor is, for example, Teflon ®, a product of the Dupont de Nemours Company.

The profiles of these cavities are arbitrary, but must be able to receive an egg. With "egg" is meant an egg in its shell, or an egg without its shell, intended to be treated as a "poached egg" or a "boiled egg". The separate component parts of the eggs or whole egg can also be treated in these moulds, so that both the egg white and the yolk or whole egg can be treated separately.

Figure 2:
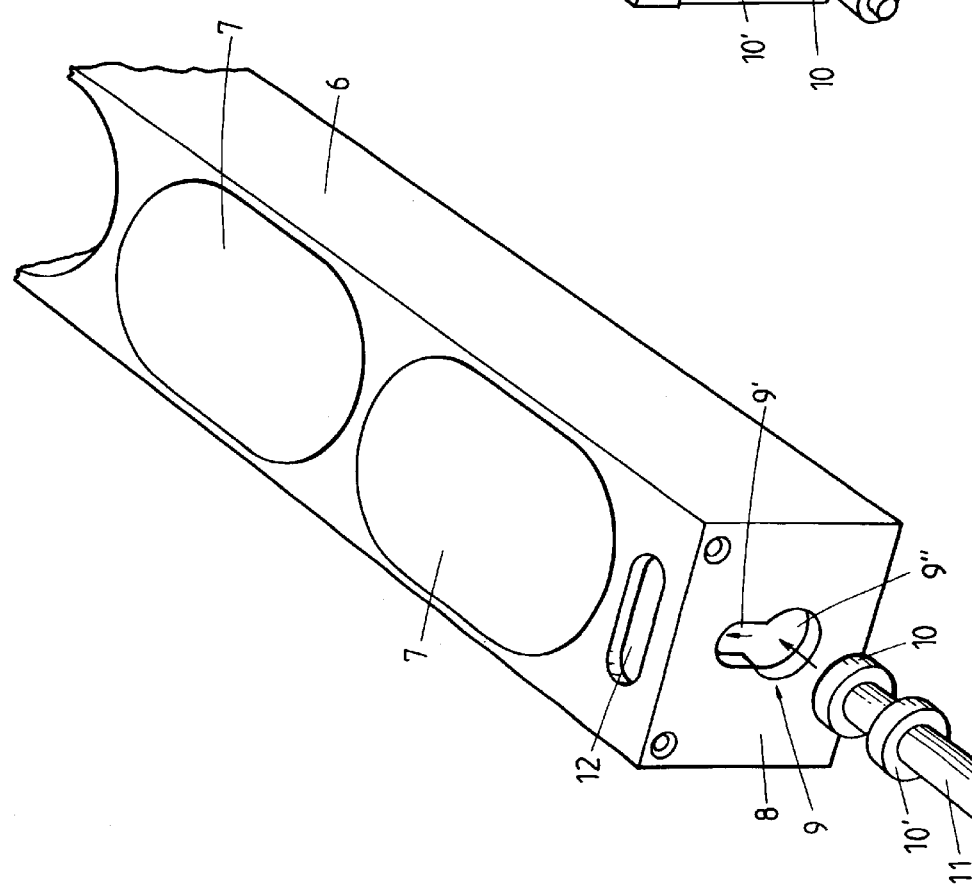
FIG. 2, at another scale, is a perspective representation of a portion of a bar with moulds belonging to the device according to the invention.

As can be deduced from FIGS. 2 and 3, the bars 6 show, in each of their side surfaces 8 a particularly profiled passage 9, the upper part 9' of which shows a smaller diameter than the lower part 9". In the profiled passage 9, the disc-shaped enlarged head 10 of a pin 11 can be inserted. There is a second ring 10' on the pin 11, along the exterior side of the side surface 8. The pin 11 is attached in a link of the chain.

The bars 6, close to their side surfaces 8, each time show an elongated cavity 12 which plays a role from the structural point of view when mounting the pins 11 with their disc-shaped heads 10. The moulds could also be made of stainless steel or plastic material, or be worked into conveyor belts.

Both chambers 1 and 2 represented schematically are provided at the top with slidable closing plates 13. These closing plates 13 show slots 14 through which the chains 3 with their axles 5 and the bars 6 suspended between the chains may circulate. The closing plates 13 are aimed among others at maintaining the temperature in both chambers 1 and 2 at the desired level. These closing plates 13 can be slided open to allow access and an easy hygienic cleaning.

In the chamber 1, water or an appropriate liquid 15 is maintained at boiling temperature or at a temperature approaching the boiling point. The temperature prevailing in the chamber 1 must be adjusted as a function of the end product to be obtained.

Figure 4:
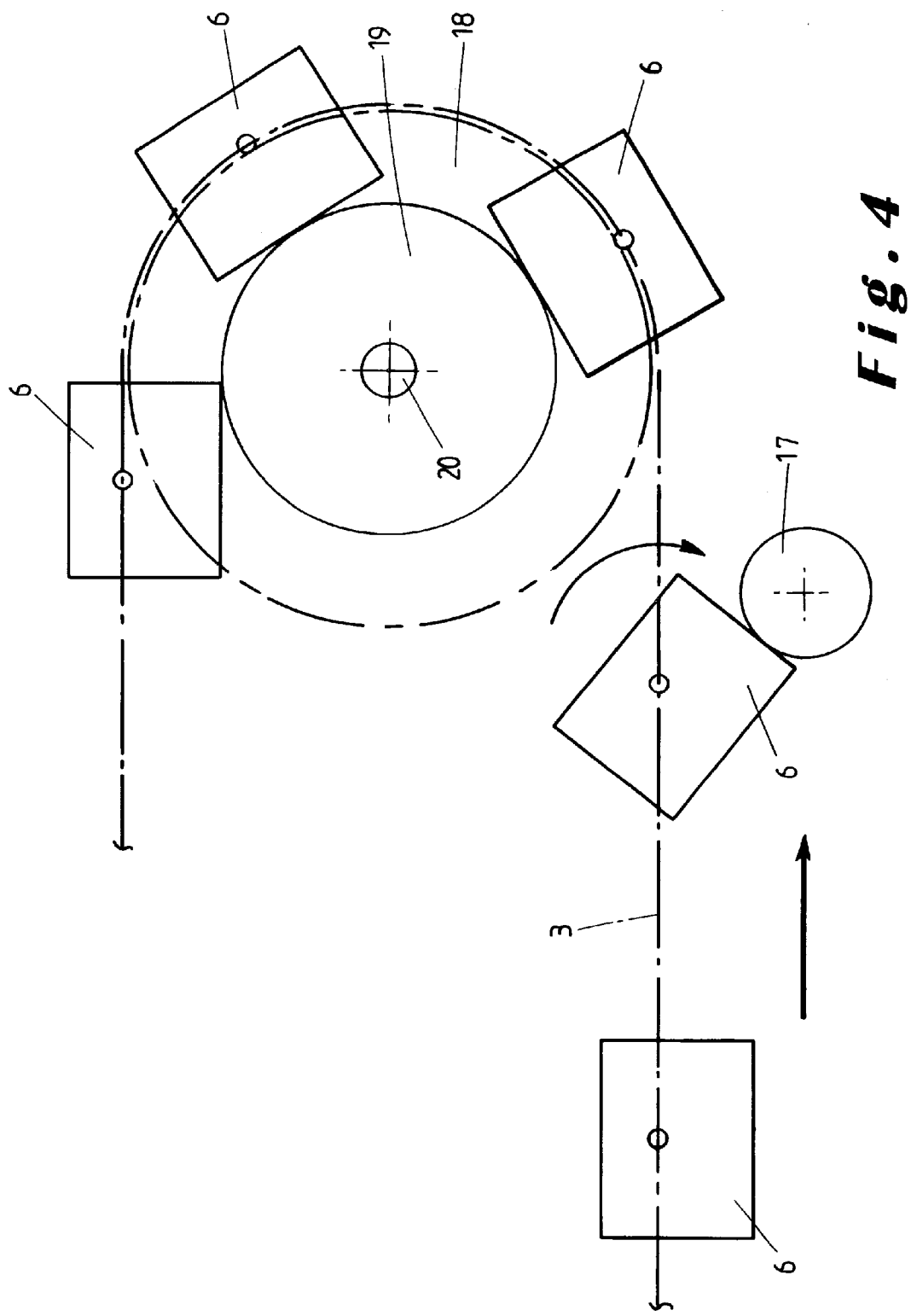
FIG. 4 shows the mechanical means enabling the tilting of the cooked egg products.

When hard boiled eggs have to be produced, the eggs out of their shells are placed in the moulds or cavities 7. During the course through the chamber 1, where an adjustable temperature is prevailing, the a solidification process of the eggs is started. This solidification process or boiling of the eggs out of their shells is continued in the chamber 2. This chamber contains boiling water, oil or steam. The moulds with the eggs circulate through these different media. The bars 6 with the cavities 7 reach the sprinkler heads 16, where the boiled or otherwise treated eggs are removed from the cavities. The bars are tilted in the device using the means represented in FIG. 4. The tilting is carried out in two steps. In the first step the bars 6, showing the cavities 7 which serve as moulds, contact a nylon disc 17 which will cause the tilting movement.

The tension of the conveyor chains 3 and the position of the toothed wheels 18, about which the chains are directed over 180°, are calculated such that this tilting is made possible. This may be deduced very clearly from FIG. 4. The position of the disc 17 is adjustable, both in height and in longitudinal direction. As soon as a bar 6 is tilted over more than 45°, this tilting movement is taken over by a second disc 19. This disc 19 is attached to the axle 20 of the toothed wheel 18. During the further movement of the conveyor chains 3 with the bars 6 suspended therein, the latter return to their original position.

Due to the tilting in the way described herein, it becomes possible to release the treated egg products from the cavities by water or air. The further finishing of the eggs is done in a way and using means which do not belong to the invention.

When the eggs have to be treated in the liquid form, for example when "poached eggs" are produced, the moulds or cavities 7 in the bars 6 are filled with liquid matter. As a function of the end product to be obtained, the moulds are lubricated with an anti-adhering agent at the height of the sprinkler heads 21 to facilitate release of the cooked eggs from the moulds. The moulds then circulate in the chamber 1 for as long as it takes the liquid matter, along the walls of the moulds and at the surface, to show a sufficient level of solidification to circulate through the chamber 2 filled with boiling water, oil or steam, and maintain its shape.

At the end of the treatment process, the eggs may be removed from the moulds. Obviously, this also applies when the moulds contain either the white, or the yolk or the whole egg of the eggs, or other prepared or conceivable egg products.

When leaving the chamber 2, the still filled cavities 7 constituting the moulds are treated with water sprinklers, for example at the height of the reference 16. The purpose thereof is to loosen the egg products processed in the moulds. After emptying the moulds, the latter are sprayed in the partially tilted position with compressed air and water or only with one of both. The latter treatment is meant to remove unloosened egg products or residues thereof. This is done at the height of the sprinkler heads 23.

By controlling the temperature both chambers 1 and 2 and the movement speed of the chains, boiled egg products in very diverse forms may be produced. The flexibility is thus a very striking feature of the invention.

The device according to the invention is designed in such a way that it may be connected to existing egg breaking machines. By adapting the width (moulds) and the length of the device (chambers), as well as the speed of the chains to the breaking machines, capacities of 5,000 to 50,000 eggs per hour or 300 to 3,000 kg of egg components per hour may be reached.

The device according to the invention is also characterised by a number of structural measures, including the drain pipes (24), the overflows (25, 26) in each of the chambers 1 and 2, a heating hose (27) at the bottom of the chamber 1 and level detection means (28, 29).

The device also allows to exchange the moulds quickly, so that different products as to contents and shape may be produced. It should be noted that other food products either or not based on eggs or egg components could be produced, so that also in this respect, the flexibility already discussed may be obtained.

From the description of the invention given above, it shows that the latter is different from the known techniques and devices used in conjunction with them, by providing a process in two steps, carried out in two chambers.

In the first chamber, a "pre-solidification" is carried out, enabling to treat the egg components in a first step, so that they can arrive in a second chamber using technically simple means, where they may be finished in their various final structures and removed from their moulds.

What is claimed is:

1. A process for cooking eggs or parts thereof, the process comprising the steps of removing the egg from its shell, introducing the egg or part thereof into a mould and moving the mould successively through a first chamber and a second chamber, thereby subjecting the mould containing the egg to a heat treatment so as to cook the egg, wherein the heat treatment comprises:

a first step of heating the mould containing the egg in the first chamber to a first temperature for a first period of time by maintaining water vapour at a temperature sufficient during said first period of time for the egg in its mould to show a sufficient level of solidification for circulation of the mould into said second chamber where the cooking process is completed; and a second step of circulating the mould through boiling water or oil or steam in the second chamber, such that the mould containing the egg is heated to a second temperature for a second period of time to cook the egg to a desired extent.

2. The process as claimed in claim 1, further comprising the step of, prior to introducing the egg, covering the surface of the mould with an anti-adhering agent to facilitate release of the egg from the mould.

3. A device for cooking eggs or parts thereof in moulds according to a process comprising the steps of removing an egg from its shell, introducing the egg or part thereof into a mould and moving the mould successively through a first heating chamber and a second heating chamber, thereby subjecting the mould containing the egg to a heat treatment so as to cook the egg, wherein the heat treatment comprises:

a first step of beating the mould containing the egg in the first chamber to a first temperature for a first period of time by maintaining water vapour at a temperature sufficient during said first period of time for the egg in its mould to show a sufficient level of solidification for circulation of the mould into said second chamber where the cooking process is completed; and a second step of circulating the mould through boiling water or oil or steam in the second chamber, such that the mould containing the egg is heated to a second temperature for a second period of time to cook the egg to a desired extent, the device comprising:

said first and second heating chambers;

a plurality of said moulds, each mould being for receiving an egg and being suspended between two parallel conveyor chains which circulate the mould in only parallel horizontal planes successively through said first and second heating chambers; and in the first chamber, heating means for maintaining vapour at a temperature to heat the first chamber to a first temperature such that the surfaces of eggs leaving the first chamber show a sufficient level of solidification for the moulds to undergo treatment by heat in said second chamber, wherein the second chamber is for containing boiling liquid, vapour or steam maintained at a second temperature to complete the cooking process.

4. The device as claimed in claim 3, herein the first and second chambers (1,2) comprise a slideable top closing plate (13), slots being provided in the closing plate (13 to allow the conveyor chain (3) with the moulds to pass through said slots.

5. The device as claimed in claim 3, wherein the moulds comprise bars (6) that are suspended from the conveyor chains (3) through pins, each mould comprising a cavity for receiving an egg.

6. The device as claimed in claim 5, wherein the bars (6) are made of metal coated with inert plastic material.

7. The device as claimed in claim 3, further comprising means for spraying an oil or lubricant into the moulds upstream of the first chamber (1) as the anti-adhering agent.

8. The device as claimed in claim 6, further comprising, at a position downstream of the second chamber, mans for injecting the moulds with pressurized water or compressed air.

9. The device as claimed in claim 8, further comprising means for rotating the bars (6) about their geometrical axis, substantially before or at the position where the pressurized water and compressed air are injected.

10. The device as claimed in claim 9, wherein the bars (6) have a rectangular cross section, and wherein the means for rotating the bars (6) comprises a disc (17), for tilting the bars (6), and a second disc (19) for maintaining the bars (6) in a rotated position and returning the bars (6) to their original position when contact between the second disc (19) and the bars is broken, the second disc being attached to an axle (20) of a toothed wheel (18) for advancing the conveyor chains (3).

* * * * *